United States Patent
Tuceryan et al.

(10) Patent No.: US 6,753,828 B2
(45) Date of Patent: Jun. 22, 2004

(54) SYSTEM AND METHOD FOR CALIBRATING A STEREO OPTICAL SEE-THROUGH HEAD-MOUNTED DISPLAY SYSTEM FOR AUGMENTED REALITY

(75) Inventors: Mihran Tuceryan, Plainfield, IN (US); Nassir Navab, Plainsboro, NJ (US); Yakup Genc, Plainsboro, NJ (US)

(73) Assignee: Siemens Corporated Research, Inc., Princeton, NJ (US)

(*) Notice: Subject to any disclaimer, the term of this patent is extended or adjusted under 35 U.S.C. 154(b) by 254 days.

(21) Appl. No.: 09/962,657

(22) Filed: Sep. 25, 2001

(65) Prior Publication Data
US 2002/0113756 A1 Aug. 22, 2002

Related U.S. Application Data
(60) Provisional application No. 60/235,067, filed on Sep. 25, 2000, provisional application No. 60/235,068, filed on Sep. 25, 2000, and provisional application No. 60/235,069, filed on Sep. 25, 2000.

(51) Int. Cl.[7] ................................................. G09G 5/00
(52) U.S. Cl. ............................. 345/8; 345/157; 348/51; 359/630
(58) Field of Search ........................... 345/7, 8, 9, 419, 345/633, 156, 157; 348/51, 52, 53; 359/13, 630; 349/11

(56) References Cited

U.S. PATENT DOCUMENTS

| | | | | |
|---|---|---|---|---|
| 6,023,276 A | * | 2/2000 | Kawai et al. | 345/419 |
| 6,064,749 A | * | 5/2000 | Hirota et al. | 382/103 |
| 6,184,847 B1 | * | 2/2001 | Fateh et al. | 345/8 |
| 6,198,485 B1 | * | 3/2001 | Mack et al. | 345/419 |
| 6,225,979 B1 | * | 5/2001 | Taima et al. | 345/157 |
| 6,445,364 B2 | * | 9/2002 | Zwern | 345/8 |
| 6,518,939 B1 | * | 2/2003 | Kikuchi | 345/8 |
| 6,603,491 B2 | * | 8/2003 | Lemelson et al. | 345/784 |
| 2002/0075201 A1 | * | 6/2002 | Sauer et al. | 345/7 |
| 2002/0105484 A1 | * | 8/2002 | Navab et al. | 345/8 |

* cited by examiner

Primary Examiner—Xiao Wu

(57) ABSTRACT

A system and method for calibrating a stereo optical see-through HMD (head-mounted display). A preferred method integrates measurement for an optical see-through HMD and a six degrees of freedom tracker that is fixedly attached to the HMD to perform calibration. Calibration is based on the alignment of a stereoscopically fused marker image, which is perceived in depth, with a single 3D reference point in a world coordinate system from various viewpoints. The user interaction to perform the calibration is extremely easy compared to conventional methods and does not require keeping the head static during the calibration process. In one aspect, a method for calibrating a stereo HMD comprises the steps of displaying a 2-dimensional marker image on each eye display of the stereo HMD for view by a user, wherein the 2-dimensional marker images are displayed with an offset so as to induce a 3-dimensional marker that is perceived by the user as being at a distance away from the user; aligning the 3-dimensional marker image with a preselected reference point; collecting calibration data associated with the alignment; and computing a model of the HMD using the collected calibration data.

26 Claims, 11 Drawing Sheets

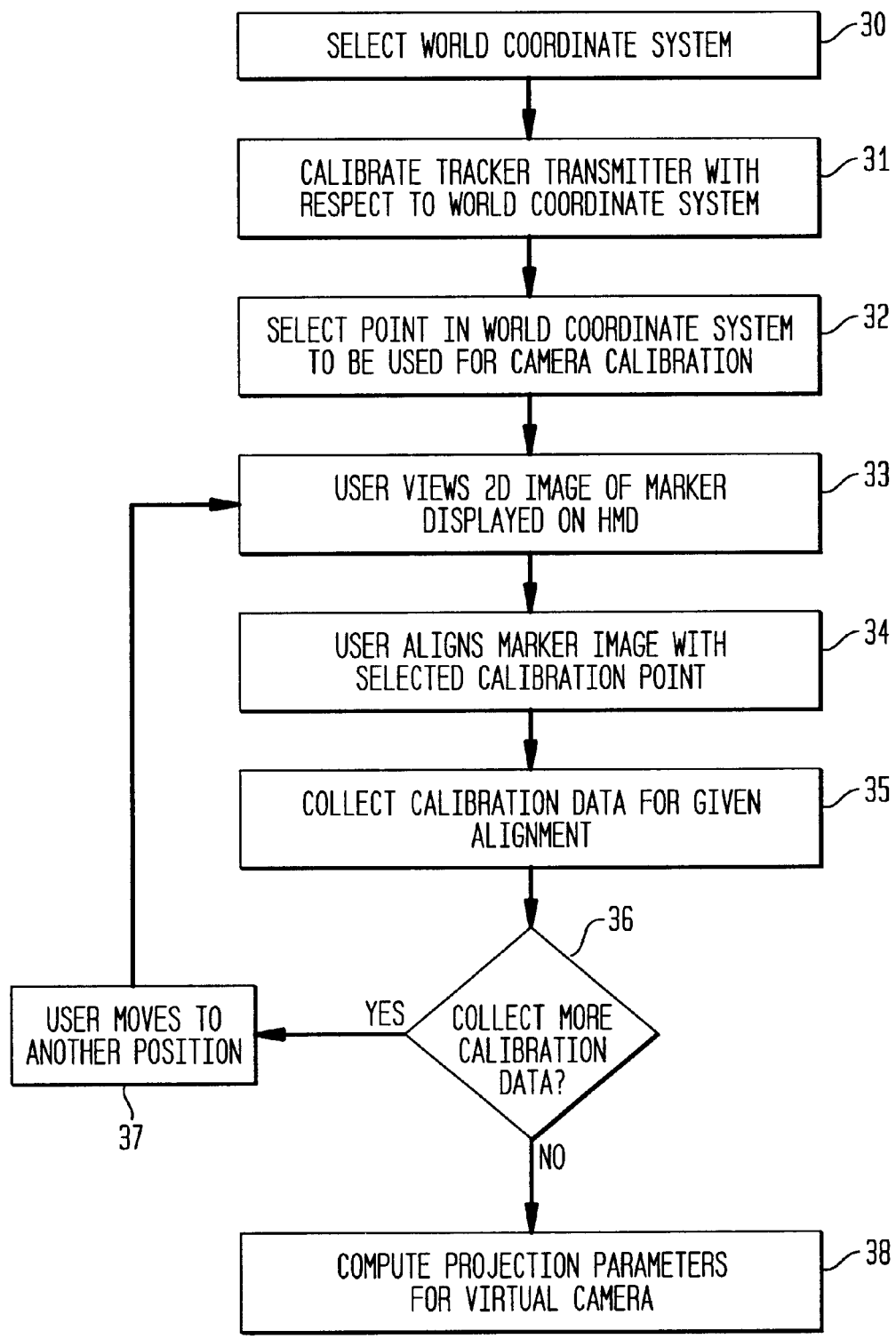

FIG. 12

| PROJECTION MATRIX | | ERROR IN REPROJECTION [PIXELS] | |
|---|---|---|---|
| | | MEAN | STD. DEV. |
| GROUND 1 | $M_L$ | 1.31859 | 0.37578 |
| | $M_R$ | 1.33312 | 0.35230 |
| STEREO 1 | $M_L$ | 1.53801 | 0.47569 |
| | $M_R$ | 1.58263 | 0.50138 |
| GROUND 2 | $M_L$ | 1.33705 | 0.32332 |
| | $M_R$ | 1.35228 | 0.30009 |
| STEREO 2 | $M_L$ | 1.41955 | 0.39548 |
| | $M_R$ | 1.38305 | 0.32819 |
| GROUND 3 | $M_L$ | 1.28706 | 0.39539 |
| | $M_R$ | 1.29697 | 0.36024 |
| STEREO 3 | $M_L$ | 1.45690 | 0.52982 |
| | $M_R$ | 1.23107 | 0.44084 |
| GROUND 4 | $M_L$ | 1.32917 | 0.41486 |
| | $M_R$ | 1.34742 | 0.40013 |
| STEREO 4 | $M_L$ | 1.49881 | 0.42945 |
| | $M_R$ | 1.31938 | 0.33465 |

SYSTEM AND METHOD FOR CALIBRATING A STEREO OPTICAL SEE-THROUGH HEAD-MOUNTED DISPLAY SYSTEM FOR AUGMENTED REALITY

CROSS-REFERENCE TO RELATED APPLICATIONS

This application claims priority from U.S. Provisional Patent Application Ser. Nos. 60/235,067, 60/235,068, and 60/235,069, all of which were filed on Sep. 25, 2000, and all of which are fully incorporated herein by reference.

TECHNICAL FIELD OF THE INVENTION

The present invention relates generally to camera calibration methods for optical see-through head-mounted display systems for augmented reality. More specifically, the present invention relates to a method for calibrating a monocular optical see-through display (i.e., a display for one eye only) and method for calibrating a stereo optical see-through display in which the displays for both eyes are calibrated in a single procedure.

DESCRIPTION OF RELATED ART

Augmented reality (AR) is a technology in which a user's view of the real world is enhanced or augmented with additional information generated from a computer model. In a typical AR system, a view of a real scene is augmented by superimposing computer-generated graphics on the view such that the generated graphics are properly aligned with real world objects as needed by the application. The graphics are generated from geometric models of both non-existent (virtual) objects and real objects in the environment. In order for the graphics and the video to align properly, the pose and optical properties of the real and virtual cameras must be the same. The position and orientation of the real and virtual objects in some world coordinate system must also be known. The locations of the geometric models and virtual cameras within the augmented environment may be modified by moving its real counterpart. This is accomplished by tracking the location of physical objects and using this information to update the corresponding transformations within the virtual world. This tracking capability may also be used to manipulate purely virtual objects, ones with no real counterpart, and to locate real objects in the environment. Once these capabilities have been brought together, real objects and computer-generated graphics may be blended together, thus augmenting a dynamic real scene with information stored and processed on a computer.

In order to have a working AR system, the display system must be calibrated so that the graphics is properly rendered. More specifically, in order for augmented reality to be effective, the real and computer-generated objects must be accurately positioned relative to each other and properties of certain devices must be accurately specified. This implies that certain measurements or calibrations need to be made at the start of the system. These calibrations involve measuring the pose of various components such as trackers, pointers, cameras, etc. The calibration method in an AR system depends on the architecture of the particular system and the types of components used.

There are two primary modes of display in an AR system which determine the type of calibration needed: (i) video-see-through AR systems; and (ii) optical see-through AR systems. An "optical see-through system" is defined herein as a combination of a see-through head-mounted display and a human eye. This display and eye combination will be referred to herein as a virtual camera of the AR display system.

One method for camera calibration for use with video see-through systems is described, for example, in the article by M. Tuceryan, et al, entitled "Calibration requirements and procedures for a monitor-based augmented reality system," *IEEE Transactions on Visualization and Computer Graphics*, 1(3):255–273, September 1995. This calibration method is based on using the correspondence between known 3-D points and the 2-D positions of their projected images positions, from which camera parameters are estimated. This calibration protocol is for a video-see-through system in which it is assumed that there is access to the picture points (pixels) that can be selected and whose image coordinates could be obtained. This protocol can be used in a video-see-through display system because the image digitized by the video camera can be accessed and used to analyze the input images.

Calibration procedures for optical see-through systems present a challenge because, in contrast to video see-through systems, there is no direct access to the image data that is used for calibration. Indeed, with an optical see-through system, the images of the scene are formed on the retina of the human user's eye and, consequently, there is no direct access to the image pixels. Accordingly, different approaches are needed for calibrating optical see-through systems. A difficult task of calibrating an optical see-through system is devising a proper user interaction paradigm for collecting the necessary data for performing the calibration. There have been previous attempts to devise such interaction methods with various degrees of success. One method uses multiple point configurations in the world in order to collect the calibration data (see, e.g., the article by A. Janin et al., entitled "Calibration of head-mounted displays for augmented reality applications," In *Proc. of VRAIS'93*, pages 246–255, 1993.) Another interactive approach for calibrating an optical see-through AR system involves having the user interactively align a model of a 3D object with multiple configurations with the physical object in the display (see, e.g., Erin McGarrity and Mihran Tuceryan, "A method for calibrating see-through head-mounted displays for AR," In $2^{nd}$ *International Workshop on Augmented Reality (IWAR '99)*, pages 75–84, San Francisco, Calif., October 1999.) This approach allows the user to adjust camera parameters interactively until the user is satisfied that a 3D model of a calibration jig is aligned properly with the physical calibration jig itself.

Such interactive calibration schemes, which require multipoint configurations and the simultaneous alignment of multi-point configurations in order to perform the camera calibration, render the user-interaction during the calibration process very cumbersome and prone to errors. Further, the number of parameters to be estimated is large, and therefore, the interaction does not provide a very intuitive feedback to the user.

Accordingly, methods for calibrating optical see-through displays that are efficient and user-friendly are highly desirable.

SUMMARY OF THE INVENTION

The present invention is directed to a system and method for calibrating a stereo optical see-through HMD (head-mounted display). A preferred method integrates measurement for an optical see-through HMD and a six degrees of freedom tracker that is fixedly attached to the HMD to perform calibration. Calibration is based on the alignment of a stereoscopically fused marker image, which is perceived in depth, with a single 3D reference point in a world coordinate system from various viewpoints. The user interaction to perform the calibration is extremely easy compared to conventional methods and does not require keeping the head static during the calibration process.

In one aspect, a method for calibrating a stereo HMD comprises the steps of: displaying a 2-dimensional marker image on each eye display of the stereo HMD for view by a user, wherein the 2-dimensional marker images are displayed with an offset so as to induce a 3-dimensional marker that is perceived by the user as being at a distance away from the user; aligning the 3-dimensional marker image with a preselected reference point; collecting calibration data associated with the alignment; and computing a model of the HMD using the collected calibration data.

The distance at which the 3-dimensional marker is perceived by the user is proportional to the offset between the 2-dimensional marker images for both eyes.

The camera model is defined with respect to a coordinate system of a tracker sensor fixedly attached to the HMD. Preferably, the camera model comprises (i) a first projection matrix that defines a transformation between the tracker sensor and a first virtual camera and (ii) a second projection matrix that defines a transformation between tracker sensor and a second virtual camera, wherein the first virtual camera comprises a combination of the left eye of the individual and a left eye display of the HMD and wherein the second virtual camera comprises a combination of the right eye of the individual and a right eye display of the HMD.

In another aspect of the invention, the calibration data for a given alignment comprises 2-dimensional image coordinates of the image marker for each eye display of the stereo HMD and 3-dimensional coordinates of the preselected reference point in the coordinate system of the tracker sensor.

In yet another aspect, the 2-dimensional image marker comprises one or various shapes including, but not limited to, a crosshair, a solid disk, or a rhombus with a cross inside the rhombus.

In another aspect, the calibration data is preferably collected for at least six different viewpoints of the user with respect to the preselected reference location.

These and other objects, features and advantages of the present invention will be described or become apparent from the following detailed description of preferred embodiments, which is to be read in connection with the accompanying drawings.

BRIEF DESCRIPTION OF DRAWINGS

FIG. 3 is a flow diagram of a method according to one aspect of the present invention for calibrating an optical see-through display for augmented reality;

FIG. 12 is table illustrating reprojection errors for reconstructed projection matrices using the calibration method of FIG. 6 on the video see-through system of FIG. 9.

DETAILED DESCRIPTION OF PREFERRED EMBODIMENTS

The present invention is generally directed to calibration methods for optical see-through head-mounted displays. In one embodiment of the present invention, a method for calibrating a monocular optical see-through display (i.e., a display for one eye only) is provided, wherein calibration is based on the alignment of image points with a single 3-dimensional point in a world coordinate system from various viewpoints. With this calibration method, the user interaction to perform the calibration is efficient and extremely easy compared to conventional calibration methods, and there is no requirement for keeping the head static while doing the calibration. In another embodiment, a method for calibrating a stereo optical see-through display is provided in which the displays for both eyes are calibrated in a single procedure. With this calibration method, the user aligns a stereoscopically fused marker, which is perceived in depth, with a single point in the world whose coordinates are known. As with the monocular calibration protocol, there is no requirement that the user's head remains fixed. These calibration methods preferably integrate measurements for a camera and a six degrees of freedom tracker that is fixedly attached to the camera to perform the calibration.

I. System Overview

Figure 1:
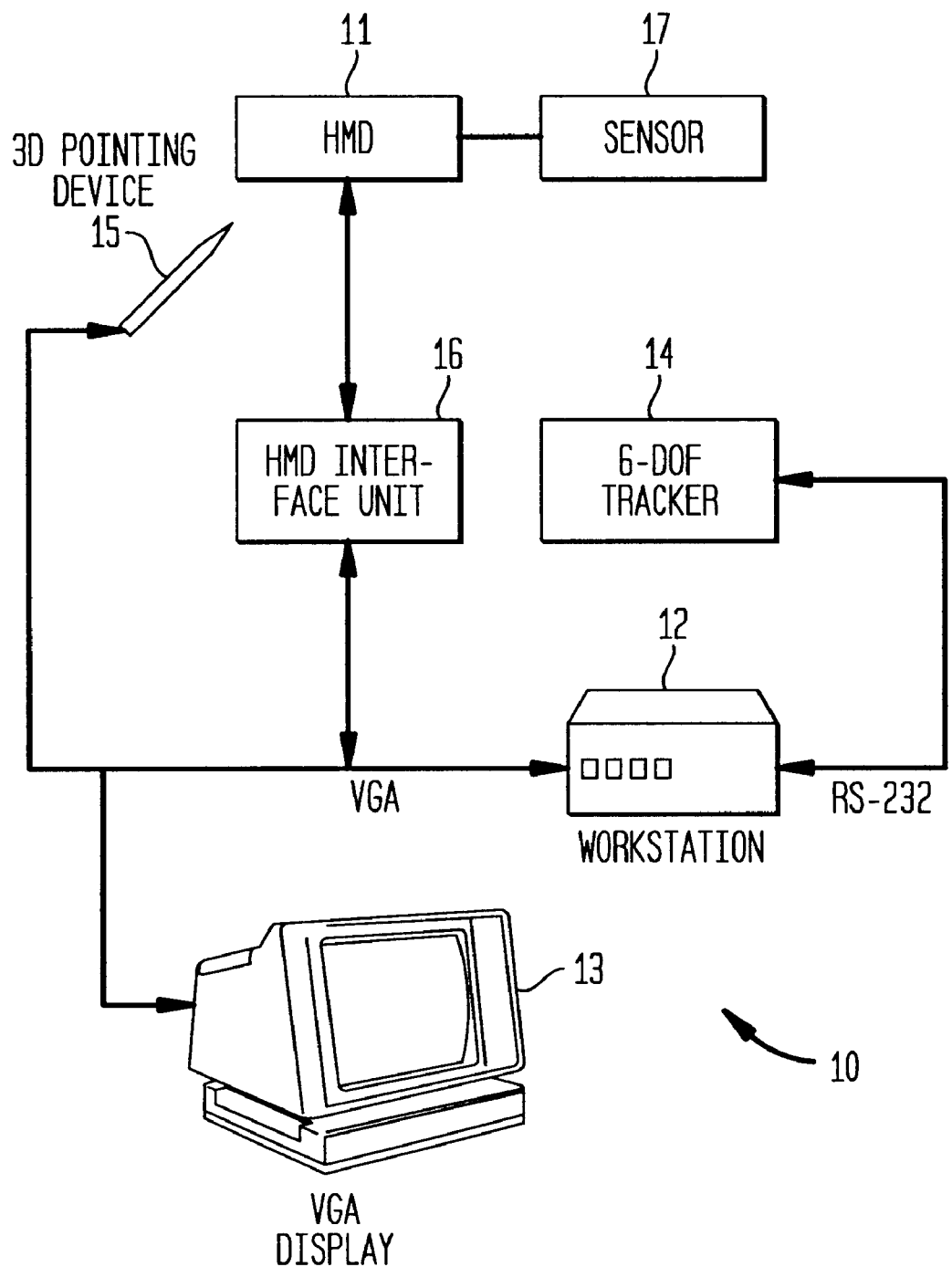
FIG. 1 is a high-level diagram of an augmented reality system in which calibration protocols according to the present invention may be employed.

Referring now to FIG. 1, a high-level diagram illustrates an optical see-through augmented reality system in which calibration protocols according to the present invention may be employed. An optical see-through AR system 10 comprises an HMD (head-mounted display) unit 11 comprising a pair of see-through head-mounted displays. Although any conventional HMD may be implemented, the HMD from i-glasses™ are employed, which can be used both as immersive displays as well as see-through displays by removing a piece of opaque plastic from the front of the display screens. The i-glasses™ HMD have a resolution of 640×480 for each eye in monocular mode and 640×240 for each eye in stereo mode.

The AR system 10 further comprises a workstation 12 (e.g., personal computer) that comprises suitable architecture for executing an AR application. A graphical image is generated by the workstation graphics hardware and simultaneously displayed on the workstation's monitor 13 and the HMD unit 11. The image is transmitted to the HMD device 11 via a VGA port and associated HMD interface unit 16. It is to be understood that the system 10 may be implemented with other, possibly higher resolution displays, such as the Sony Glastron. A tracker system 14, which comprises a tracker transmitter and suitable hardware, can be any system that is capable of providing six degrees of freedom (three positional and three rotational). For example, the tracker system 14 may be the six-degrees-of-freedom (6-DOF) magnetic tracker (Flock-of-Birds from Ascension Technologies) or an infrared vision based tracker. The tracker 14 is operatively connected to the workstation 12 via an RS-232 interface and provides the workstation 12 with continually updated values for the position and orientation of tracked objects including, for example, the HMD device 11 and a 3-D mouse pointing device 15. In accordance with the present invention, the HMD device 11 comprises a receiver (sensor) 17 (or "mark") that is fixedly attached to the HMD device 11. The receiver 17 detects signals transmitted from the tracker transmitter 14. A "mark" refers to a tracker receiver that is attached to an object being tracked in the AR system 10, which objects include the HMD device 11. In this regard, the term "camera mark" specifically refers to a tracker receiver (i.e., sensor 17) fixedly attached to the HMD device 11.

In a preferred embodiment, the AR application that runs on the workstation 12 is based on the "Grasp" system that was developed at ECRC (European Computer-Industry Research Centre) for the purposes of writing AR applications. In accordance with the present invention, the Grasp software has been extended with calibration methods described herein. The Grasp software and the calibration extensions according to the present invention are implemented using the C++ programming language.

In accordance with the present invention, the system 10 is extended such that the user can interactively place a 3D object in the scene using the 3D pointer. In one embodiment, a virtual object can be placed in the scene where the tip of the pointer is placed.

II. Overview of Calibration Requirements

In an AR system, there are both "real" entities in the user's environment and virtual entities. Calibration is the process of instantiating parameter values for mathematical models that map the physical environment to internal representations, so that the computer's internal model matches the physical environment. These parameters include, for example, optical characteristics of a physical camera and position and orientation (pose) information of various entities such as the camera, the magnetic trackers, and the various objects. Calibration requirements of a video-see-through AR system were described in the above-referenced article by M. Tuceryan, et al., "Calibration requirements and procedures for a monitor-based augmented reality system," *IEEE Transactions on Visualization and Computer Graphics*, 1(3):255–273, September 1995 (hereinafter "Tuceryan Reference"), which is incorporated herein by reference. In accordance with one aspect of the present invention, these requirements are extended and modified for calibration of an optical see-through system.

Figure 2:
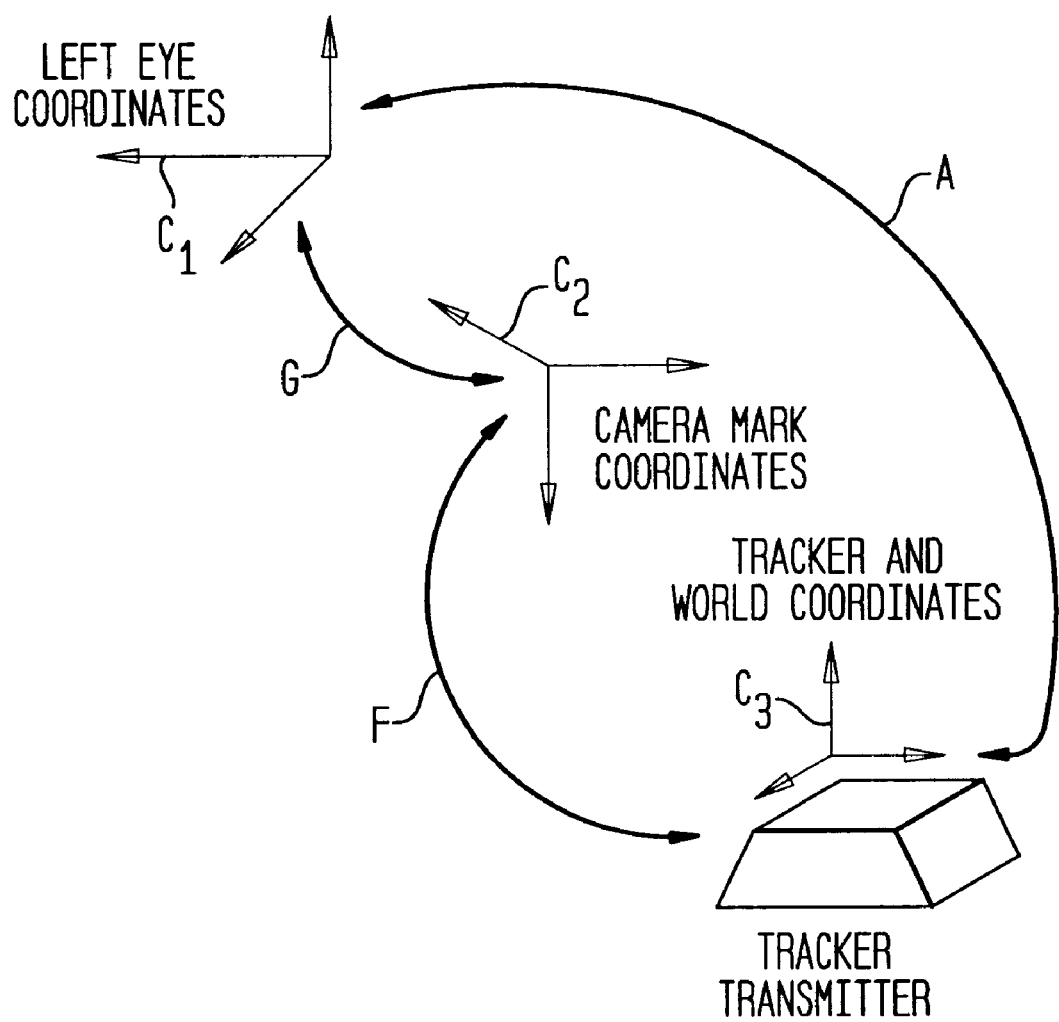
FIG. 2 is a diagram illustrating an exemplary coordinate system that is implemented for performing calibration of an optical see-through display for augmented reality, according to one aspect of the present invention.

FIG. 2 is a diagram illustrating an exemplary coordinate system that is implemented for performing calibration of an optical see-through display for augmented reality according to one aspect of the present invention. More specifically, FIG. 2 illustrates a coordinate system for a monocular AR system in which the user views the graphic through one eye. The calibration requirements for such an optical see-through system originate from the fact that all the transformations shown must be known during the operation of the AR system. As explained in detail below, some of these transformations are directly read from sensors such as the 6-DOF trackers and some of the transformations are estimated through a calibration process in accordance with the invention.

Referring now to FIG. 2, the coordinate systems comprise an eye coordinate system C1, a camera sensor (or camera mark) coordinate system C2, and a coordinate system C3 which represents a combined tracker coordinate system and a WCS (world coordinate system). The central reference is the WCS, which is at a fixed and known location relative to the operating environment. During the operation of an AR system, all of the components need to operate in a unified framework that, in the case of the Grasp system, is the WCS. In the exemplary embodiment of FIG. 2, the tracker coordinate system and the WCS are the same. It is to be understood however, that the tracker coordinate system and WCS can be different. By making these coordinate systems the same, additional calibration issues that are beyond the scope of this invention need not be addressed. These calibration issues are discussed in detail in the above-incorporated Tuceryan Reference.

The coordinate systems C1, C2 and C3 are related to each other by a set of rigid transformations. In particular, transformation A defines the relation between the eye coordinate system C1 and the combined tracker and WCS C3, transformation F defines the relation between the camera sensor (or mark) coordinate system C2 and the combined tracker and WCS C3, and transformation G defines the relation between the camera mark coordinate system C2 and the eye coordinate system C1. The tracker transformation F is read directly from the sensor (mark) attached to the HMD. Again, for the monocular case, only one eye is used to display the graphics, and the display for the other eye is covered so that the AR display is truly monocular. As explained below in detail, in accordance with the present invention, the transformation G from the mark to one eye is unknown and requires calibration and the transformation A that models the camera with respect to the WCS is inferred from the transformations F and G.

Camera calibration is the process by which the extrinsic camera parameters (location and orientation) as well as the intrinsic camera parameters (focal length, image center, and aspect ratio) are calculated for a given camera. Normally, this process would calculate the transformation A as well as the camera intrinsic parameters. In the case of a video-see-through camera calibration system, this would be the estimation of the parameters for the physical camera. In the case of optical see-through AR system, estimating A directly would require the collection of a sufficient number of 3D-2D point correspondences without moving the head and body in the process. Because this is a virtually impossible task, a calibration method according to the present invention comprises calibrating the transformation G (which is fixed because the tracker sensor is rigidly attached to the HMD) and inferring the transformation A from transformations G and F. Accordingly, the resulting calibration parameters describe a virtual camera that models the combined imaging system formed by the HMD and the human eye.

In this architecture, a point $P_w$ in the WCS is projected on the image plane of the virtual camera as $P_i$ with:

$$\rho P_i = AP_w = GFP_w \qquad (1)$$

where, as indicated above, G is the projection matrix from tracker mark coordinate frame C2 to the virtual image plane C1.

III. Camera Calibration for Optical See-through Displays

The following section provides an overview of calibrations protocol for an optical see-through head mounted display according to the present invention. Section III(a) below describes a preferred camera model and overview of a calibration formulation. Section III(b) describes a preferred calibration method for monocular optical see-through head-mounted display and sections III(c) and (d) describe a preferred calibration method for stereo optical see-through head-mounted display.

Generally, calibration protocols according to the present invention are designed to be efficient and user-friendly as such protocols provide mechanisms for simplifying the data collection process and reducing errors in the calibration. Indeed, as explained in detail below, the data collection process for calibration requires the user to align a single cursor with only a single point (at a given time) in the world. This is in contrast to conventional camera calibration methods which have access to pixel data in a video buffer or to conventional interactive calibration methods in which the user is either required to keep his/her head from moving while collecting data or the user is required to interactively align a multi-point configuration simultaneously. It is to be understood that although preferred calibration protocols described herein involve aligning a single point at a given time, the present invention does not preclude the use of multiple calibration points, but only that multiple points be used one at a time. Indeed, the use of multiple calibration points (one at a time) provides a mechanism for extending the methods described herein to calibrate for trackers that extend over a large area.

Moreover, calibration protocols according to the present invention maintain a camera model as a projection matrix without decomposing the model into its intrinsic and extrinsic components, thereby providing calibration results that are numerically more stable as compared to conventional methods. Indeed, conventional calibration methods that use traditional intrinsic and extrinsic camera parameterization to model the virtual camera require solving a set of non-linear equations in order to obtain the calibration results. As explained below, calibration protocols according to this invention employ a projection matrix representation to model the camera that can be estimated by linear methods, making the result of the calibration more robust. Such protocols do not need to extract anything more than the projection matrix because ultimately the 3D objects are projected onto the image plane.

Accordingly, the present invention provides a mechanism whereby the user interaction needed to collect the data for the calibration is a streamlined process and does not impose a great burden on the user. During this process of aligning a single cursor on the display with a single world point, there is no interaction with a mouse or any other interaction device to try to move items on the display at the same time that the head is moving. These types of multiple tasks increase the complexity and make the calibration process more cumbersome. Therefore, a major source of errors as well as a source of difficulty in interaction is eliminated by keeping the user interaction simple in the calibration procedure.

(a) Camera Model and Calibration Formulation

A preferred camera model that defines parameters to be estimated for calibration will now be described in detail. A simple pinhole model is used for the camera, which defines the basic projective imaging geometry with which 3-D objects are projected onto a 2-D image surface. There are different ways of setting up the coordinate systems, and in a preferred model, a right-handed coordinate system is used in which the center of projection is at the origin and the image plane is at a distance $f'$ (focal length) away from it.

A pinhole camera can be modeled by a set of intrinsic and extrinsic parameters. The intrinsic parameters are those that define the optical properties of the camera such as the focal length, the aspect ratio of the pixels, and the location of the image center where the optical axis intersects the image plane. Another intrinsic parameter is the skew of the image plane axes. The intrinsic parameters are preferably modeled by a 3×3 matrix of the form:

$$\Pi = \begin{bmatrix} f_u & \tau & r_o \\ 0 & f_v & c_o \\ 0 & 0 & 1 \end{bmatrix} \quad (2)$$

where $f_u$ and $f_v$ are the focal lengths in the directions of two major axes in the image plane, $(r_o, c_o)$ is the location of the image center, and $\tau$ is the skew between the two axes in the image plane. The $f_u$ and $f_v$ also model the scale factor and aspect ratio in going from the sensor units to image units. The 3D points in the world coordinate system get projected onto the image plane of the camera to form the image points.

The extrinsic parameters define the position and orientation (pose) of the camera with respect to some external world coordinate system and are given by a 3×3 rotation matrix R and a 3×1 translation vector T.

The camera transformation that maps 3-D world points into 2-D image coordinates can be characterized by writing the transformation matrices for the rigid transform defining the camera pose and the projection matrix defining the image formation process. This is given by the following equation:

$$\rho P_i = \Pi[R\ T]P_w \quad (3)$$

where $P_w=[x_w, y_w, z_w, 1]^T$ is the homogeneous 3-D coordinates of the world point and $P_i=[x_i, y_i, 1]^T$ is the homogeneous coordinates of its image. The overall camera transformation, therefore, is a 3×4 matrix:

$$T_{camera} = \Pi[R\ T] \quad (4)$$

The entries of $T_{camera}$ can be estimated directly instead of the actual extrinsic and intrinsic camera parameters. This estimation is a standard technique often used in computer vision. The calibration proceeds by collecting a number of 2D image coordinates of known 3D calibration points, and the correspondence between the 3D and 2D coordinates defines a linear system to be solved in terms of the entries of the camera matrix. Details of the camera calibration computation are provided below in Section V.

Normally, in traditional video cameras, this 3D-2D correspondence is done by identifying the calibration points in a statically grabbed image of a calibration jig. In an optical see-through display, collecting these correspondences in a similar way would require that the HMD and the user's head (and body) be fixed. Since this is not realistic, the present invention provides a data collection process that does not require the user to keep his/her head and body fixed.

More specifically, in a preferred embodiment as shown in FIG. 1, a tracking system is rigidly attached to the HMD. Again, the tracker can be any suitable system that provides 6-DOF positional and rotational data such as a magnetic tracker or an infrared vision based tracker. The tracker system can read (sense) the position and orientation of the receiver (which is attached to the HMD) in the tracker coordinate system. The tracker sensor attached to the HMD (the object to be tracked) is referred to herein as the mark. Because the mark is attached rigidly to the HMD, the camera can be defined and calibrated with respect to the mark coordinate system. Therefore, taking this approach, the camera transformation is fixed and, consequently, unaffected by the head motion. Advantageously, the user can freely move his/her head freely during a calibration procedure.

Referring again to FIG. 2, as indicated above, there are three coordinate systems C1, C2 and C3 that are relevant for the monocular camera calibration, and the transformations between them (A, F and G) are shown. The transformation A is the 3×4 projective camera transformation with respect to the WCS that is estimated as in traditional video-based systems. The transformation F is a 4×4 homogeneous transformation matrix that defines the tracker mark position and orientation that is continually sensed by the tracker transmitter and updated. Finally, the transformation G comprises a 3×4 projection matrix that defines the camera transformation with respect to the mark coordinates.

To calibrate the camera (i.e., estimate the transformation A), image coordinates of known 3D points in the world coordinate system must be obtained. But the transformation A is not fixed and varies as the user moves his head. Therefore, in accordance with the present invention, the transformation A is obtained indirectly by estimating the transformation G which does not change, and computing A=GF.

To estimate the transformation G, a single known 3D calibration point is selected and transformed into the mark coordinate system. For a calibration point in the WCS, its coordinates in the mark coordinate system C2 are given by $P_M=FP_W$. Then, we can use the collected 3D-2D correspondences between the points in the mark coordinate system C2 and their image coordinates and use the standard camera calibration methods to estimate the 3×4 camera matrix G. Again, the details of the estimation of the camera matrix is described below in section V.

(b) Calibration Procedure For A Monocular Display

To implement a practical calibration procedure for a monocular optical see-through display, the above formulation should be converted to a user-friendly procedure. In other words, the method of collecting the calibration data should minimize the burden on the user and the chances of making errors. Referring now to FIG. 3, a flow diagram illustrates a method for calibrating an optical see-through display according to one aspect of the present invention. Initially, the user will select a WCS (step 30). In a preferred embodiment, the WCS is fixed with respect to the tracker coordinate system by defining the WCS on the tracker transmitter box, such as shown, e.g., in FIG. 4(a) when a magnetic tracker system is used (in the case of a vision-based tracker system, the WCS is the same as the tracker coordinate system). Then, a calibration procedure is performed to calibrate the tracker transmitter with respect to the WCS (step 31) using, for example, the techniques described in the above-incorporated Tuceryan Reference. The calibration of the tracker transmitter is then stored. It is to be understood that fixing the WCS with respect to the tracker transmitter has an added advantage that the tracker can be moved at will to any position and the calibration will still remain valid. The WCS could also be assumed to correspond to the tracker coordinate system. However, typically, the exact location of the tracker coordinate system on the transmitter box is not known. Therefore, it is preferred to define the WCS (whose location is known) and estimate its relation to the unknown tracker coordinate system by a calibration procedure.

Figure 4A:
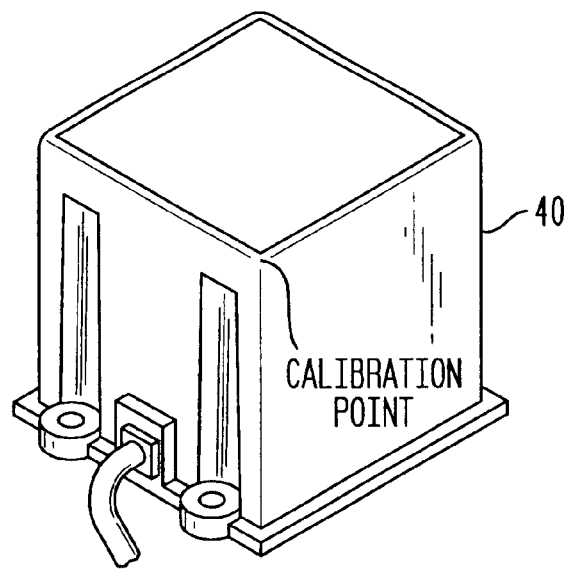
FIG. 4a is a diagram illustrating the relationship between a tracker coordinate system and a world coordinate system.
Figure 4B:
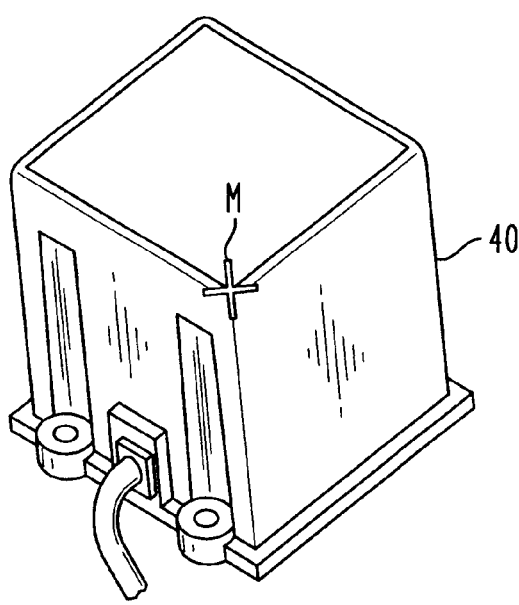
FIG. 4b is a diagram illustrating a marker alignment process according to one aspect of the present invention.

To begin the virtual camera calibration, a single point in the world coordinate system is selected to collect the calibration data (step 32). For example, as shown in FIG. 4(a), a fixed calibration point is selected on the corner of the magnetic transmitter box. The user is then presented with a 2D marker (e.g., crosshair) on the display (step 33). The user will then move his head and body until the displayed marker is aligned with the image of the single calibration point as seen by the user (step 34). For example, as shown in FIG. 4(b), the displayed crosshair is shown aligned with the calibration point of FIG. 4(a). It is to be understood that the term marker generically refers to any 2D marker on the display that the user aligns with the calibration point in the world. The shape of this marker becomes important, particularly in the case of the stereo calibration procedure, in order to improve the perception of alignment in depth, as explained below.

Once the marker is aligned with the fixed calibration point, the user selects the alignment by, e.g., clicking on a button on the 3D mouse (FIG. 1) and the data is collected for the given alignment and stored for calibration (step 35). The data that is collected comprises the image coordinates of the 2D marker $P_I$ and the 3D coordinates of the calibration point in mark coordinates $P_M$.

The fixed single point in the world coordinate system is preferably mapped to many distinct points in the mark coordinate system as the user's head (and body) is moved about. This is given by the formula $P_M=FP_W$. Since F is changing as the head moves, so is, therefore, the coordinates of the point, $P_M$ in the mark coordinate system even though $P_W$ is fixed. Preferably, a minimum of 6 points is collected for the calibration. To account for the errors and obtain a more robust result, however, more points could be collected (wherein a least squares estimation is used as stated in equation 7 below).

After the user has collected data for a given position, if the user desires to collect more data (affirmative determination in step 36), the user will move to another position (step 37) and repeat the data collection process (steps 33–35). Once all calibration data is collected, the camera parameters will be computed (step 38), preferably using equation (7) below.

During the camera calibration process, the more volume of the tracker that the user's head covers, the more of possible systematic errors in the tracker measurements will be taken into account in the optimization process. Accordingly, the user is preferably encouraged to move his head around the tracker transmitter as much as possible while collecting the calibration data. It is not always easy for the user to cover all possible angles during the calibration. For example, it is easier for the user to move around the calibration point sideways than trying to obtain top views. Preferably, the user will perform the calibration from the set of viewpoints that the user will use during the operation of the AR system. One restriction on the user's movements during calibration is that if the tracker being used has any intrinsic range restrictions, naturally, the user will be restricted to those areas. For example, most conventional magnetic trackers have range restrictions from three feet to ten feet. In this case also, the user is encouraged to cover as much of the volume that is going to be actually used. It is to be appreciated, however, that the calibration procedure does not have any intrinsic restrictions about which areas the user should cover during calibration. Again, the user should try to cover as much of the operating area as possible.

With the monocular optical see-through display calibration method described above, the 2-D marker comprises a crosshair centered on the pixel and its components have odd numbered lengths. The resolution of the marker is limited by the resolution of the display and clearly this can have an effect on the accuracy of the result. However, even more important is how the user actually aligns this cursor with the calibration point. Even if the marker was designed with great resolution, there would be no control over how the user aligns the marker during calibration. Errors originating from the tracker and user's alignment are greater sources of error than the resolution of the cursor.

(c) Calibration Formulation for Stereoscopic Displays

The following describes a preferred protocol for calibrating a stereo HMD, which is an extension of the above calibration method for a monocular HMD. In one embodiment, the method comprises independently calibrating the left and right displays of the HMD using the above monocular calibration method. However, a preferred method keeps the user interaction as simple and as little cumbersome as possible, without having to calibrate the left and right displays independently.

Figure 5:
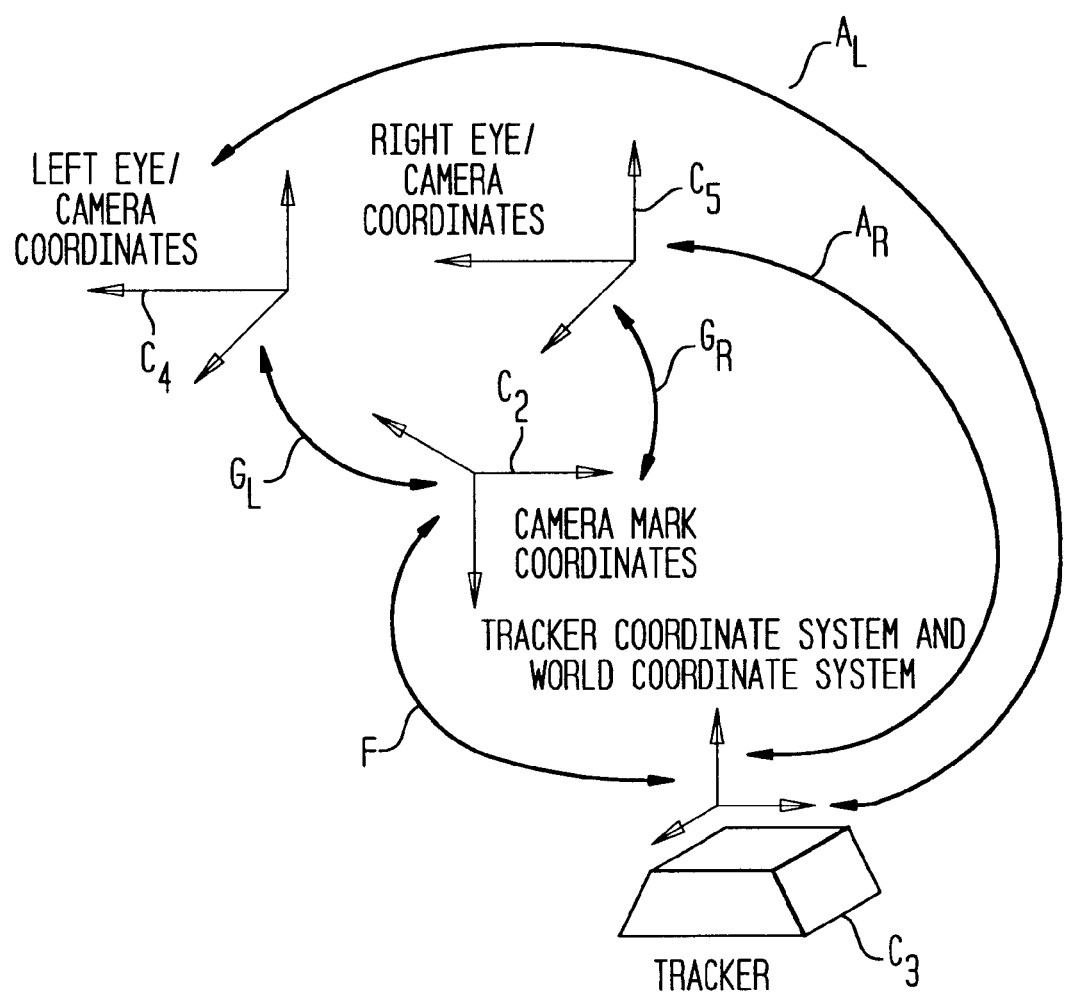
FIG. 5 is a diagram illustrating an exemplary coordinate system that is implemented for performing calibration of an optical see-through display for augmented reality, according to another aspect of the present invention.

In a preferred embodiment, the camera model and the mathematics of the calibration are the same as the monocular calibration method described above, but now there are two displays, a left and right display. FIG. 5 is a diagram illustrating an exemplary coordinate system that is implemented for performing calibration of an optical see-through display for augmented reality according to another aspect of the present invention. More specifically, FIG. 5 illustrates a coordinate system for a stereo AR system in which the user views the graphic through both eyes. As shown, five transformations $A_L$, $A_R$, F, $G_L$ and $G_R$ are estimated. The transformations $A_L$ and $A_R$ each denote a 3×4 projective camera transformation with respect to the WCS. Similarly, F comprises a 4×4 homogeneous transformation matrix that defines the transformation between the tracker coordinate system C3 and the camera mark coordinate system C2. That is, F is the pose of the mark coordinate system C2 with respect to the tracker transmitter coordinate system C3 (which is assumed to be the WCS also). Finally, $G_L$ and $G_R$ each comprise 3×4 projection matrices that define the camera transformations C4 and C5, respectively, with respect to the mark coordinates C3. As in the monocular case, for simplicity we assume that the tracker and world coordinate systems are the same (i.e., C3). Assuming the WCS and tracker coordinate systems are the same, the coordinate system of FIG. 5 can be summarized by the following equations:

$$A_L = G_L F$$

$$A_R = G_R F \quad (5)$$

In accordance with the present invention, the calibration data is collected as a set of 3D-2D point correspondences that are used to solve for the camera matrices $G_L$ and $G_R$. In a preferred embodiment, the process of collecting calibration data for both eyes is performed via a single step. Instead of calibrating the two eyes separately, a virtual object (3D marker) is aligned with a known physical target (calibration point). The alignment simultaneously yields two sets of constraints, which in turn can be used to calibrate the optical see-through display. This stereo alignment process in not as straightforward as in the monocular calibration due to the complexities associated with the stereo perception of human visual system. In fact, in the monocular case, the alignment is performed in the image whereas in the stereo case, the alignment is performed in 3D. Briefly, a preferred stereo alignment process comprises the following. The two eyes are presented with the image of a marker with some disparity. This causes the user to see a virtual object that is at some distance away. The user will then align the virtual object with a physical target in the scene. This alignment process raises new challenges including the choice of the shape of the virtual object and the physical target and how to display the virtual object without any knowledge of the characteristics of the optical see-through HMD and eye combination, i.e., the projection model of the virtual camera.

(d) Calibration Procedure for Stereoscopic Displays

Figure 6:
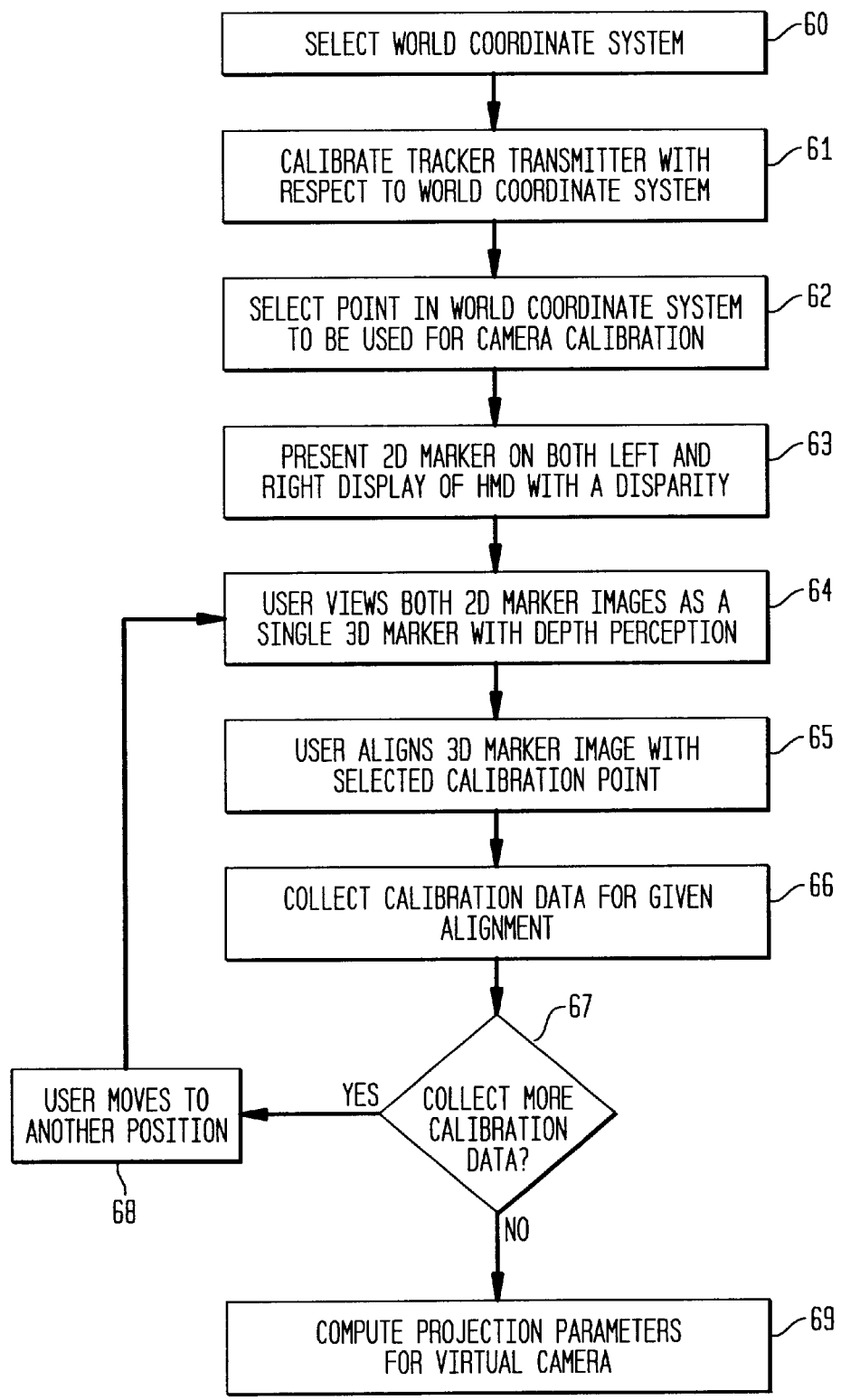
FIG. 6 is a flow diagram of a method according to another aspect of the present invention for calibrating an optical see-through display for augmented reality.

Referring now to FIG. 6, a flow diagram illustrates a method for calibrating an optical see-through display according to another aspect of the present invention. In particular, the flow diagram of FIG. 6 illustrates a method for calibrating a stereo display. Initially, the user will select a WCS (step 60). In a preferred embodiment, the WCS is fixed with respect to the tracker coordinate system by defining the WCS on the tracker transmitter box, such as shown in FIG. 4 for the monocular calibration method using a magnetic tracker system (in the case of a vision-based tracker system, the WCS is the same as the tracker coordinate system). Then, a tracker transmitter calibration is performed (step 61) using, for example, the techniques described in the above-incorporated Tuceryan Reference. The calibration of the tracker transmitter is then stored.

To begin the virtual camera calibration, a single point in the world coordinate system is selected to collect the calibration data (step 62). As with the calibration method described above for a monocular optical see-through display, the fixed single point in the world coordinate system is preferably mapped to many distinct points in the mark coordinate system as the user's head (and body) is moved about. This is given by the formula $P_M = F P_W$. Since F is changing as the head moves, so is, therefore, the coordinates of the point, $P_M$ in the mark coordinate system even though $P_W$ is fixed.

Figure 7:
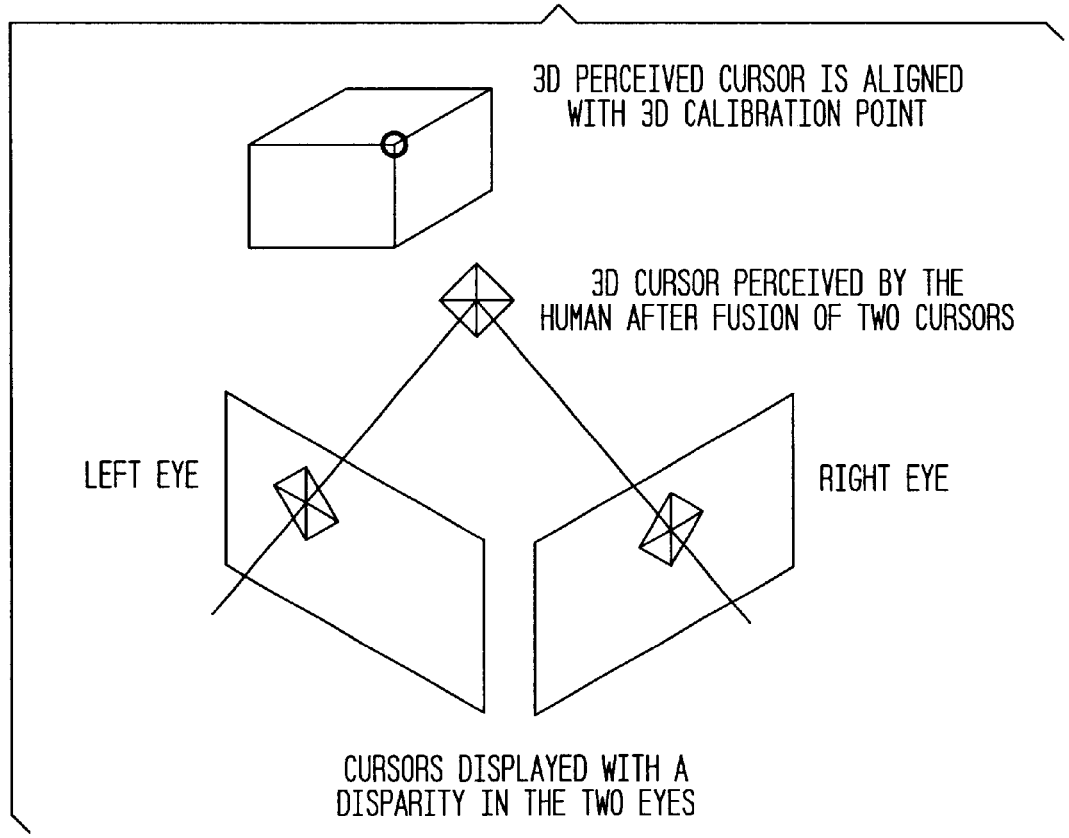
FIG. 7 is a diagram illustrating a marker alignment process according to another aspect of the present invention.

As the user is observing the physical world through a stereo HMD, the user is presented with a 2D marker on the display for each eye placed randomly in the 2D image plane (step 63). The markers for the two eyes are slightly offset (e.g., in the horizontal direction) thereby creating a disparity. The user's brain automatically fuses these markers and the user perceives it in 3D at a particular location in depth. In other words, when viewed in stereo, the two markers induce a virtual object (marker) that is perceived at some distance away from the user (step 64). The user collects the calibration data by moving his head and body until the perceived marker in 3D is aligned with the 3D physical calibration point (step 65). This alignment process is illustrated in FIG. 7. When the alignment is done, the user's head will be at some distance away from the physical marker proportional to the disparity.

It is to be understood that the term marker generically refers to any 2D marker on the display that the user aligns with the calibration point in the world. The shape of this marker is selected to improve the perception of alignment in depth. The distance at which the virtual marker is perceived is proportional to the amount of disparity between the images of the marker in the two eyes. For any choice of disparity, the alignment can be done from many different positions keeping the user's head at some fixed distance away from the physical target as long as the disparity remains the same.

Once the 3D marker is aligned with the fixed calibration point, the user clicks a button on the 3D mouse and the data is collected and stored for calibration (step 66). The data that is collected for calibration comprises the 2D image coordinates of the marker (e.g., crosshair $(x_i, y_i)$) and the 3D coordinates of the calibration point in the mark coordinates $P_M=(x_M, y_M, z_M)$. Since the marker positions of both eyes are obtained when the mouse is clicked, and since the user has aligned the 3D markers with the 3D world point, this is equivalent to having the two markers in the two eyes aligned with the corresponding images of the world point. Therefore, at the moment that the mouse button is clicked and the calibration data is collected, data in the form of $P_I$ and $P_M$ is collected for both left and right eyes simultaneously. In particular, the marker position $P_{I,L}$ for the left eye and $P_{I,R}$ for the right eye. And since a single mark is attached to the entire goggles that is moving rigidly, the world point position in mark coordinates is the same for both eyes. This calibration data can be used to estimate the camera parameters for both the left and right eyes independently.

After the user has collected data for a given position, if the user desires to collect more data (affirmative determination in step 67), the user will move to another position (step 68) and repeat the data collection process (steps 64–67). Again, for any choice of disparity, the alignment can be done from many different positions keeping the user's head at some fixed distance away from the physical target as long as the disparity remains the same.

Once all calibration data is collected, the virtual camera parameters (projection matrices) will be independently computed for each eye (step 69) using equation (7) below. As in the monocular case, the user is encouraged to cover as much of the tracker volume that will be used during the operation of the AR system. After the projection matrices are estimated for the left and right eyes (cameras), they are integrated in Grasp and "OpenGL" as described in Section VI below, in order to render the graphics with the correct perspective.

Since the camera geometry is not known before the calibration is actually performed, there is no rigorous way of determining what the disparity should be for the image markers in the left and right eyes. However, an idea about what the depth range should be can be determined either by the range restrictions of some trackers or by the fact as the distance in perceived depth of the marker increases, the depth acuity of the user decreases and alignment becomes harder. With these restrictions in mind, in a preferred embodiment, the disparities should be selected in a range such that when the HMD is worn, the marker in depth is roughly within arms length and within the tracker range. It is to be understood that there is no need to compute the actual depth of the marker and the values of the disparities are inputs to the calibration procedure. What is preferred is that the disparity results in a fused marker in depth that is reasonably easy to align in depth. The disparity will also vary based on the marker shape presented to the user during the data collection process.

It is to be further understood that no assumptions are made that the result of the calibration will be the same for different users. Indeed, the fact that the camera matrices $G_L$ and $G_R$ are estimated for each user means that we are not assuming that they are the same for different users. Also, this means that variations in interocular distances and any differences in depth perceptions will be accounted by the camera matrices estimated for each user.

IV. Experimental Verification for Calibration

One problem associated with verifying an optical see-through display calibration is that it is not possible to show how well the model corresponds with the object for a human viewer. This is a difficult task for the monocular displays, but it is even more difficult to show quantitative results for the stereoscopic displays.

There are a number of ways to approach this problem from simple to more complex. One approach for either type of display is to have a human put on the HMD, perform a calibration procedure as described above, and report whether the result is "good" or "bad". There is no way, however, of reporting any objective data on these experiments.

Figure 8:
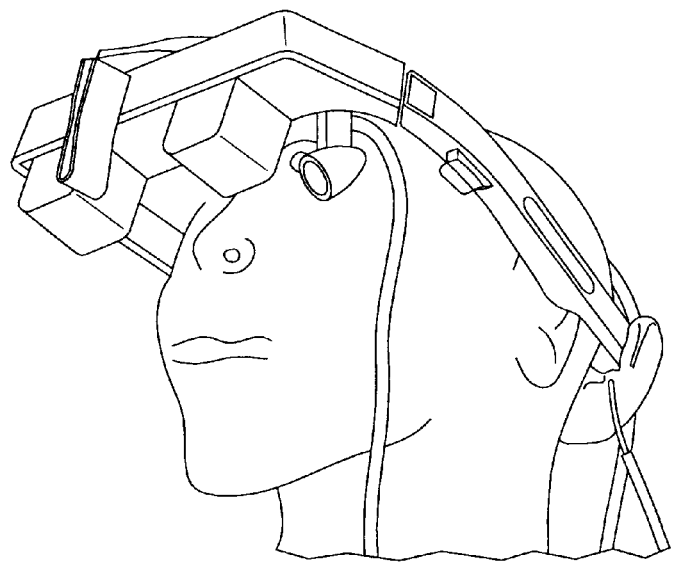
FIG. 8 is a diagram illustrating a device for verifying a calibration procedure according to the present invention.

Another verification approach is to replace the human eye with a video camera in some fashion in the optical-see-through displays and apply the calibration method via this camera (with the displays). This allows us to obtain video images of the procedure as well as the results. FIG. 8 illustrates a setup in which a camera is put in a mannequin's head behind the HMD (I-glasses) displays and the display is recorded. We have tried this calibration method in numerous trials and in all instances the calibration results are very good. The quality of the calibration results does not change greatly as the head moves around in the world.

In the case of using magnetic trackers, some of the factors that affect the calibration include the distance of the user's head from the tracker transmitter and how quickly the user clicks the mouse to collect the calibration data. For example, some magnetic trackers have a range of about 3 feet and the quality of the sensor readings are not very reliable when the receivers operate near the boundaries of this range. The problems arising from this can be alleviated if an extended range tracker is used that has a larger operational volume (about 10 feet). The second factor that affects the calibration is the lag in the tracker data at the point of collection (i.e., when the mouse is clicked). If the button is clicked too quickly, the tracker data read may not correspond to where the user's head is. It has been found that if a user is careful during the calibration, both of these factors can be controlled to obtain good calibration results.

Another approach to quantify the accuracy of calibration is to use a video-see-through setup and calibrate it using a calibration protocol according to the present invention. This provides an approximation of the conditions and optics of the optical-see-through displays. In the process, it allows the event to be captured on video and later analyzed to determine the accuracy of the results. Therefore, a verification procedure according to one aspect of the present invention implements a calibration procedure described herein in a video see-through system.

Figure 9:
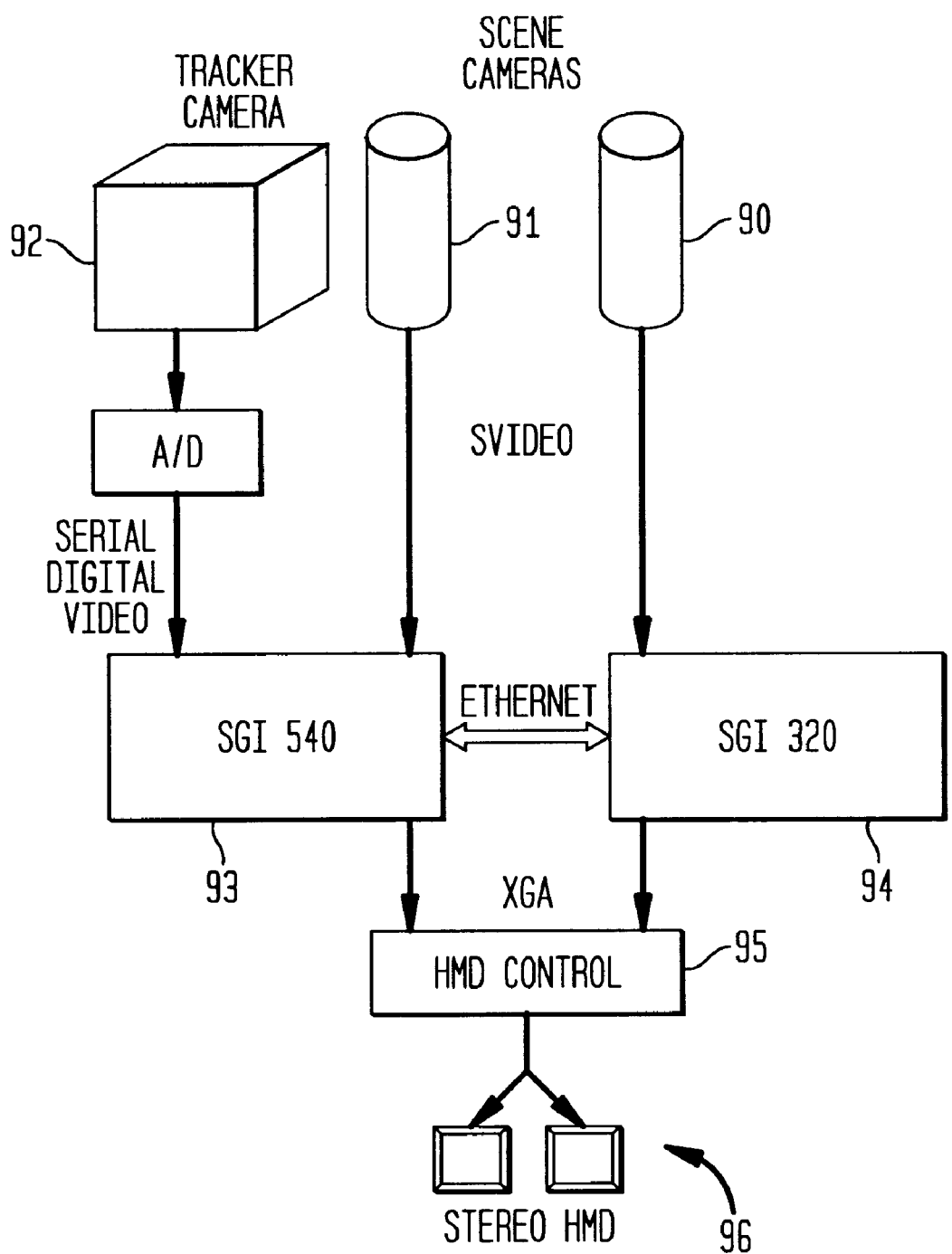
FIG. 9 is a diagram of a conventional video see-through system that may be used as a test bed for verifying a calibration method according to the present invention.

An exemplary video see-through system that can be used is the one developed by Sauer et al., which is described in detail in the reference by F. Sauer, et al, entitled "Designing an AR test bed," *In Proceedings of the International Symposium on Augmented Reality*, pages 47–53, Munich, Germany, October 2000. FIG. 9 illustrates a schematic diagram of the exemplary video see-through system, which is based on a Kaiser ProView XL35 HMD. Two Panasonic GP-KS1000 color cameras 90, 91, provide stereo images, a tracker camera (e.g., a black and white Sony XC-77RR with a wide angle lens) is used for tracking. An SGI 540 visual PC 93 and an SGI 320 visual PC 94 process the three video streams. An HMD control interface 95 operatively interfaces with a stereo HMD 96. The system runs in real-time at a frame rate of 30 frames per second and exhibits a low latency of only about 2 frames. The software was developed under Windows NT and now runs under Windows 2000.

Figure 10:
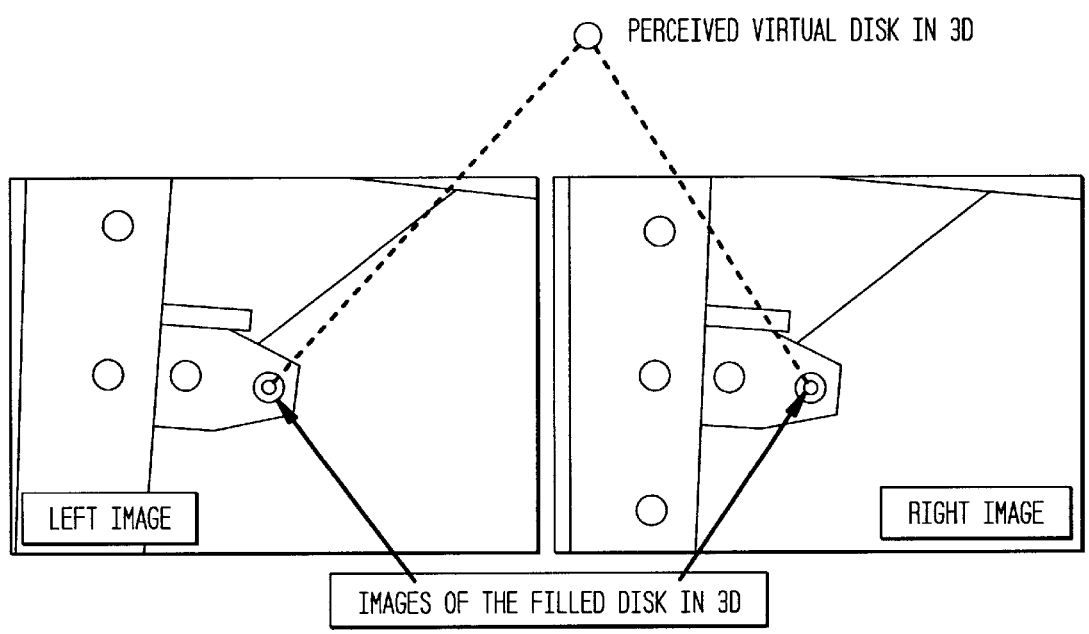
FIG. 10 is a diagram illustrating a marker alignment process according to yet another aspect of the present invention.

FIGS. 7 and 10 explain a 3D stereo alignment process. As explained above, in FIG. 7, as a user is observing the physical world through a stereo HMD, a marker is displayed in the left and right eyes with a disparity. When viewed in stereo, these markers induce a virtual object that is perceived as some distance away from the user. The user's job is to align the perceived virtual mark with a physical target in the scene. When the alignment is done, the user's head will be at some distance away from the physical marker proportional to the disparity. The distance at which the virtual marker is perceived is proportional to the amount of disparity between the images of the marker in the two eyes. For any choice of disparity, the alignment can be done from many different positions keeping the user's head at some fixed distance away from the physical target as long as the disparity remains the same.

As indicated above, experiments have shown that in the case of stereo calibration in which depth perception is important, the choice of the display marker shape is important. In a monocular calibration method, a marker shaped like a cross-hair (as in the monocular calibration) can be used to align with a surface mark in the scene. However, unlike the monocular case, the cross-hair shape does not provide sufficient visual cues in the stereo calibration for the user to accurately align the 3D maker with the calibration point in depth. Other marker shapes were tested, and the more successful shapes provided the perception of a plane with an orientation as well as the depth.

For example, it was determined that a solid disk or a rhombus shape with a cross inside provided sufficient results. FIG. 10 is a diagram that illustrates an alignment in stereo with a video see-through system. The left and right images illustrate a physical target (the center of the hole) augmented with the virtual disk. The hole provides strong visual clues for the eyes allowing sufficient depth perception. A cross-hair marker provides weaker visual clues for the depth perception.

Another critical choice is that of the physical target. Alignment of the virtual disk and a surface mark was determined to be problematic due to the fact that the human brain is confused while the virtual object is still visible at the same time it is perceived behind the surface of a solid object. This problem is addressed by preferably selecting the physical target as the center of a circular hole cut on a planar surface. This allows the user to move back and forth to align the depth correctly.

To assess the degree of accuracy of the stereo alignment process described above, an experiment was conducted using a video see-through system. Since a video see-through system provides the complete tracking and calibration parameters, the experiment was performed using a video see-through system. Initially, the disparity between the left and right images of the virtual marker was set such that the virtual marker was at some distance away from the user. Using the calibration parameters obtained for the two cameras providing the stereo image stream for the HMD, we computed the position of the virtual object in the tracker coordinate system was computed. We then let the users repeatedly perform the alignment from different positions for the same disparity. With a fixed disparity, the users can move their head on a sphere centered at the physical target. Therefore, when the virtual marker and the physical target are aligned, the different positions of the user's head should be at the same distance to the physical target. We recorded around 15–35 such alignments per user for two different disparity values (resulting in marker distance of 750 mm and 720 mm). We found in each case that these alignments resulted in an average distance very close to the measured ones with a standard deviation of around 1 mm or better.

Figure 11A:
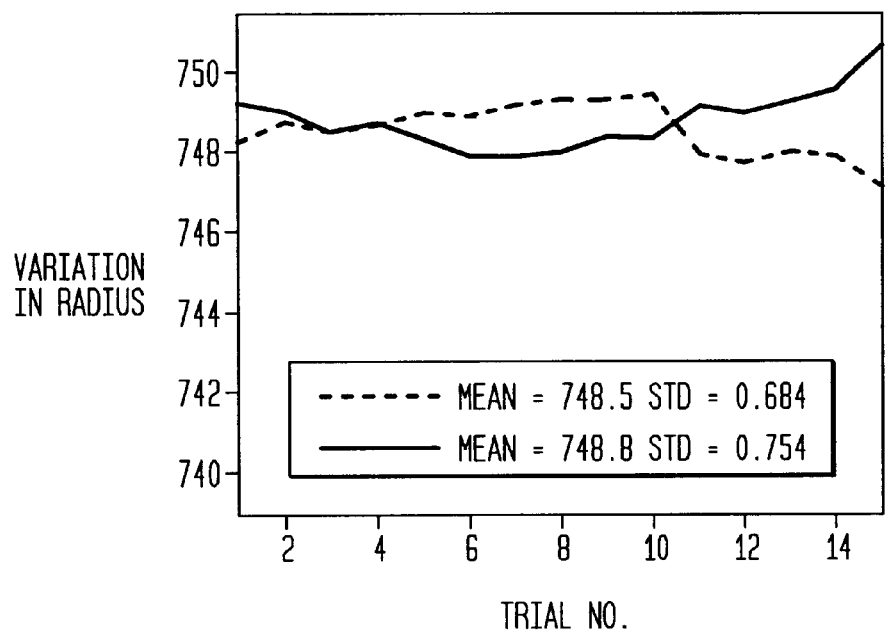
FIGS. 11(a) and 11(b) are diagrams illustrating experimental results of measuring the accuracy of depth judgment for a perceived 3D marker.
Figure 11B:
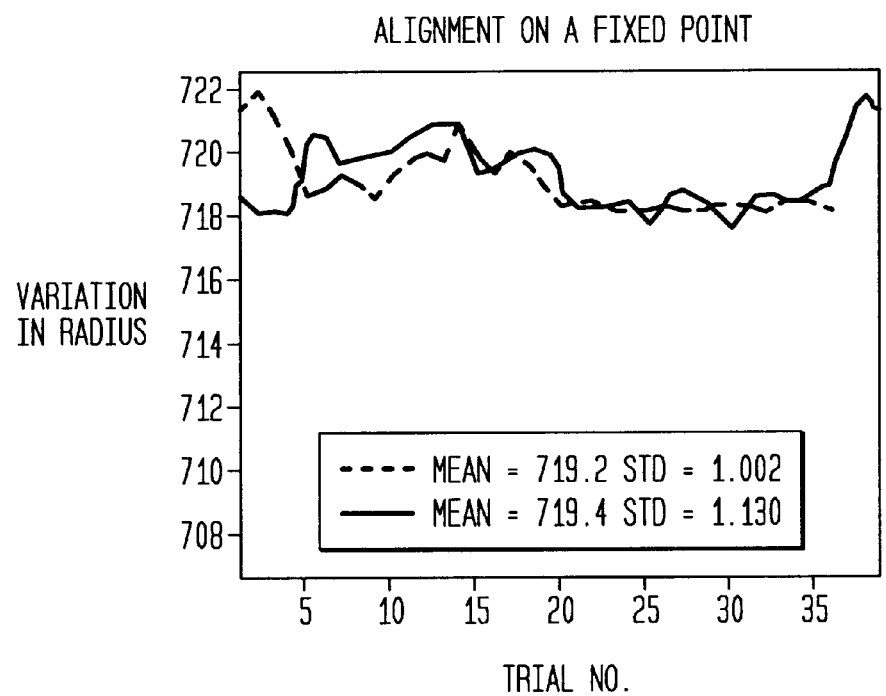

More specifically, FIGS. 11(a) and (b) each illustrate experimental results of multiple trials of depth alignment for a typical user for a perceived 3-D disk. For each experiment, two stereo pairs of images of a disk were aligned with respect to the center of a hole in the scene as explained above with reference to FIG. 10. Each pair restricts the position of the camera centers to lie on a sphere centered about the 3D scene point. FIG. 11(a) shows the alignment results for the ground truth distance of 750 mm over 15 trials, and FIG. 11(b) shows the alignment results for the ground truth distance of 720 mm over 36 trials (x-axis). Both (a) and (b) show the results of the trials for the same user. As can be observed from the graph, the alignment is very consistent over the trials for the particular user. We have also tried for other users and the results are comparable to this example.

Furthermore, experiments were conducted to assess the reprojection errors for reconstructed projection matrices using the calibration algorithm on the video see-through system. Since optical see-through system does not provide any means of measuring the reprojection errors, the video see-through system becomes a good test bed for validating the performance of the calibration algorithm. The results of these experiments are shown in FIG. 12, wherein the results of four different experiments (with two individuals repeating the experiment twice) were obtained. To enable a comparison, the projection matrices for each camera were computed from the calibration parameters of the video see-through system which is obtained by the camera calibration algorithm (as described in the article by R. Y. Tsai, entitled "A versatile camera calibration technique for high-accuracy 3D machine vision metrology using off-the-shelf TV cameras," *IEEE J. of Robotics and Automation*, 3(4): 323–344, 1987), and these parameters were deemed ground truth values. In other words, the ground truth corresponds to the projection matrix obtained using the calibration and tracking results from the system. The reconstructed projection matrices using the proposed algorithm is labeled as stereo. As it can be seen in FIG. 12, the reprojection errors for both the ground truth and the reconstructed ones are quite low, less than 1.5 pixels on the average.

V. Standard Camera Calibration Formulation

An exemplary projective camera calibration, which is implemented in the calibration protocols of the present invention, will now be described in detail. Let there be n calibration points whose image coordinates we measure. There are 12 parameters of the 3×4 projection matrix we need to estimate. But the projection matrix is defined up to a scale factor, therefore, there are really 11 independent parameters that need to be estimated. Therefore, n, the number of calibration points to be measured, should be at least 6. Let the $i^{th}$ measurement point have homogeneous mark coordinates $P_{M,i}=[x_{M,i}, y_{M,i}, z_{M,i}, 1]^T$ and its image point have homogeneous image coordinates $P_{I,i}=[x_i, y_i, 1]^T$. The basic camera equation is given by $$\rho P_{I,i} = G P_{M,i} \text{ for } i=1, \ldots, n \quad (6)$$

This gives us a linear equation to solve for the entries of the 3×4 camera matrix G:

$$Bp=0 \quad (7)$$

in which p is the unknown parameter vector that consists of all the entries $[g_{i,j}]$ of the G matrix put into a column vector.

The coefficient matrix B is given by $$B = \begin{bmatrix} \vdots & \vdots & \vdots & \vdots & \vdots & \vdots & \vdots & \vdots & \vdots & \vdots & \vdots & \vdots \\ x_{M,i} & y_{M,i} & z_{M,i} & 1 & 0 & 0 & 0 & 0 & -x_i x_{M,i} & -x_i y_{M,i} & -x_i z_{M,i} & -x_i \\ 0 & 0 & 0 & 0 & x_{M,i} & y_{M,i} & z_{M,i} & 1 & -y_i x_{M,i} & -y_i y_{M,i} & -y_i z_{M,i} & -y_i \\ \vdots & \vdots & \vdots & \vdots & \vdots & \vdots & \vdots & \vdots & \vdots & \vdots & \vdots & \vdots \end{bmatrix} \quad (8)$$

The matrix B has 2n rows, two rows for each data point, and 12 columns.

Solving this equation gives us the camera matrix G. As mentioned above, there are only 11 independent parameters and the camera equation is valid up to a scale factor. Therefore, to solve the camera Equation (7), we estimate the unknown parameter vector p by minimizing $\|Bp\|^2$ such that $\|p\|=1$. This puts a constraint on the scale and reduces the number of parameters to 11. The solution to this constraint minimization is found by finding the eigenvector associated with the smallest eigenvalue (see, e.g., Emanuele Trucco and Alessandro Verri. *Introductory Techniques for 3-D Computer Vision*. Appendix A, Prentice-Hall, 1998.) In practice this is done by finding the singular value decomposition (SVD) of the matrix B given by $B=UDV^T$, and the solution is the column of the matrix V corresponding to the smallest singular value.

VI. Integrating the Projection Matrix with OpenGL

Since, in a preferred embodiment, the camera model comprise a 3×4 projection matrix, we have to implement the renderer to use a camera defined by a 3×4 projection matrix. The OpenGL (which is an open Graphics Library standard upon which the Grasp system is built) does not provide an easy interface to do this. Thus, we had to write a camera class in C++ that is defined by a projection matrix, but uses a number of OpenGL calls to implement the camera.

The decision to write a C++ camera class is a result of the fact that all our implementation is done using the GRASP platform developed at ECRC which was written in C++. In fact, the new camera class is implemented as a subclass of the GRASP camera class. In implementing this camera class, we have to be careful that (i) the renderer does not take a performance hit, and (ii) we do not want to extract explicit intrinsic camera parameters for doing this. So, in our implementation we set up the viewing transformation as an Orthographic projection, but push our own constructed viewing matrix onto the transformation stack.

To accomplish this, we need to create a 4×4 matrix that has the clipping plane information from OpenGL as well as our estimated camera projection matrix entries. So, here are the steps to convert it into an OpenGL viewing matrix. First, we make our 3×4 camera matrix G into a 4×4 matrix which has the depth entries in the third row. This is accomplished by multiplying the camera matrix with the transform $$\begin{bmatrix} 1 & 0 & 0 \\ 0 & 1 & 0 \\ 0 & 0 & -(f+n) \\ 0 & 0 & 1 \end{bmatrix} \quad (9)$$

Here, f and n are the far and near clipping planes used by OpenGL. In addition to the far and near clipping planes, there are the top (t), bottom (b), left (l), and right (r) clipping planes, which will be used in the equations below.

Next, we add in the entry that is used for Z-buffer quantization as defined by the matrix:

$$\begin{bmatrix} 0 & 0 & 0 & 0 \\ 0 & 0 & 0 & 0 \\ 0 & 0 & 0 & f \cdot n \\ 0 & 0 & 0 & 0 \end{bmatrix} \quad (10)$$

Next, we define the form of the orthographic projection matrix in OpenGL, as defined by the function call glOrtho (l,r.b.t.n,f). This is given by the matrix $$\begin{bmatrix} 2(r-l)^{-1} & 0 & 0 & -\frac{r+l}{r-l} \\ 0 & 2(t-b)^{-1} & 0 & -\frac{t+b}{t-b} \\ 0 & 0 & -2(f-n)^{-1} & -\frac{f+n}{f-n} \\ 0 & 0 & 0 & 1 \end{bmatrix}$$

Finally, we obtain the OpenGL viewing matrix by putting all these together as follows:

$$CAM = \left( \begin{bmatrix} 1 & 0 & 0 \\ 0 & 1 & 0 \\ 0 & 0 & -f-n \\ 0 & 0 & 1 \end{bmatrix} G + \begin{bmatrix} 0 & 0 & 0 & 0 \\ 0 & 0 & 0 & 0 \\ 0 & 0 & 0 & fn \\ 0 & 0 & 0 & 0 \end{bmatrix} \right)$$

$$\begin{bmatrix} 2(r-l)^{-1} & 0 & 0 & -\frac{r+l}{r-l} \\ 0 & 2(t-b)^{-1} & 0 & -\frac{t+b}{t-b} \\ 0 & 0 & -2(f-n)^{-1} & -\frac{f+n}{f-n} \\ 0 & 0 & 0 & 1 \end{bmatrix}$$

In summary, the present invention described above is directed to camera calibration procedures for optical see-through head-mounted displays for augmented reality systems. Because in augmented reality systems we do not have direct access to the image produced on the retina, the procedure needs to use indirect methods to do the calibration. The calibration methods described above advantageously use an interactive method to collect calibration data that does not require that the user keep his/her head still. The method presented works for calibration of monocular as well as stereoscopic optical see-through head-mounted displays.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A method for calibrating a stereo see-through HMD (head-mounted display) for augmented reality, the method comprising the steps of:

displaying a 2-dimensional marker image on each eye display of a stereo optical see-through HMD for view by a user, wherein the 2-dimensional marker images are displayed with an offset so as to induce a 3-dimensional marker that is perceived by the user as being at a distance away from the user;

the user visually aligning the 3-dimensional marker image with a preselected reference point;

collecting calibration data associated with the alignment for both eyes simultaneously; and computing a model of the HMD using the collected calibration data.

2. The method of claim 1, wherein the distance at which the 3-dimensional marker is perceived is proportional to the offset between the 2-dimensional marker images for both eyes.

3. The method of claim 1, wherein the model is defined with respect to a coordinate system of a tracker sensor fixedly attached to the HMD.

4. The method of claim 3, wherein the model comprises a first projection matrix that defines a transformation between the HMD and coordinates of the tracker sensor for the left eye of the user and a second projection matrix that defines a transformation between the HMD and coordinates of the tracker sensor for the right eye of the user.

5. The method of claim 3, wherein the calibration data for a given alignment comprises 2-dimensional image coordinates of the image marker for each eye display of the stereo HMD and 3-dimensional coordinates of the preselected reference point in the coordinate system of the tracker sensor.

6. The method of claim 1, wherein the preselected reference point is located on a tracker transmitter.

7. The method of claim 1, wherein the 2-dimensional image marker comprises a crosshair.

8. The method of claim 1, wherein the 2-dimensional image marker comprises a solid disk.

9. The method of claim 1, wherein the 2-dimensional image marker comprises a rhombus with a cross inside the rhombus.

10. The method of claim 1, wherein the reference point comprises a center of a circular hole in a planar surface.

11. The method of claim 1, wherein the steps of aligning and collecting are performed for each of a plurality of different locations at the same approximate distance from the preselected reference point.

12. The method of claim 11, wherein calibration data is collected for at least six different locations.

13. A program storage device readable by a machine, tangibly embodying a program of instructions executable by the machine to perform method steps for calibrating a stereo see-through HMD (head-mounted display) for augmented reality, the method steps comprising:

displaying a 2-dimensional marker image on each eye display of a stereo optical see-through HMD for view by a user, wherein the 2-dimensional marker images are displayed with an offset so as to induce a 3-dimensional marker that is perceived by the user as being at a distance away from the user, and which the user visually aligns to a preselected reference point;

receiving as input, calibration data for both eyes simultaneously, which calibration data is associated with an alignment of the 3-dimensional marker image with preselected reference point; and computing a model of the HMD using the collected calibration data.

14. The program storage device of claim 13, wherein the distance at which the 3-dimensional marker is perceived is proportional to the offset between the 2-dimensional marker images for both eyes.

15. The program storage device of claim 13, wherein the model is defined with respect to a coordinate system of a tracker sensor fixedly attached to the HMD.

16. The program storage device of claim 15, wherein the model comprises a first projection matrix that defines a transformation between the HMD and coordinates of the tracker sensor for the left eye of the user and a second projection matrix that defines a transformation between the HMD and coordinates of the tracker sensor for the right eye of the user.

17. The program storage device of claim 15, wherein the calibration data for a given alignment comprises 2-dimensional image coordinates of the image marker for each eye display of the stereo HMD and 3-dimensional coordinates of the preselected reference point in the coordinate system of the tracker sensor.

18. The program storage device of claim 13, wherein the preselected reference point is located on a tracker transmitter.

19. The program storage device of claim 13, wherein the 2-dimensional image marker comprises a crosshair.

20. The program storage device of claim 13, wherein the 2-dimensional image marker comprises a solid disk.

21. The program storage device of claim 13, wherein the 2-dimensional image marker comprises a rhombus with a cross inside the rhombus.

22. The program storage device of claim 13, wherein the reference point comprises a center of a circular hole in a planar surface.

23. An augmented reality system, comprising:

a stereo optical see-through HMD (head-mounted display) comprising a first and second eye display;

a tracker system comprising a transmitter and at least one sensor, wherein the sensor is fixedly attached to the HMD; and a workstation, operatively connected to the tracker system and HMD, comprising computer readable program code embodied therein for calibrating the HMD, wherein the computer readable program code comprises program code for simultaneously collecting calibration data for a first virtual camera and second virtual camera to compute a model that defines a relation between the first virtual camera and the sensor and a relation between the second virtual camera and the sensor, wherein the first virtual camera comprises a combination of the left eye of the individual and a left eye display of the HMD and wherein the second virtual camera comprises a combination of the right eye of the individual and a right eye display of the HMD.

24. The system of claim 23, wherein the computer readable program code comprises program code for:

displaying a 2-dimensional marker image on each eye display of the stereo HMD for view by a user, wherein the 2-dimensional marker images are displayed with an offset so as to induce a 3-dimensional marker that is perceived by the user as being at a distance away from the user;

receiving as input, calibration data associated with an alignment of the 3-dimensional marker image with a preselected reference point; and computing a model of the HMD using the collected calibration data.

25. The system of claim 24, wherein the calibration data for a given alignment comprises 2-dimensional image coordinates of the image marker for each eye display of the stereo HMD and 3-dimensional coordinates of the preselected reference point in the coordinate system of the tracker sensor.

26. A method for calibrating a stereo see-through HMD (head-mounted display) for augmented reality, the method comprising the steps of:

collecting calibration data by aligning a 3-dimensional maker image, which is perceived by a user through a first and second eye display of a stereo optical see-through HMD, to a fixed location, which is viewed by an individual through the HMD, for each of a plurality of different viewpoints within a same approximate distance away from the fixed location; and computing a model using the calibration data, wherein the model defines a relation between a coordinate system of a virtual camera and a coordinate system of a tracker sensor fixedly attached to the HMD, wherein the virtual camera comprises a combination of the first and second eye displays of the HMD and both eyes of an individual.

* * * * *